(12) United States Patent
Gehrmann et al.

(10) Patent No.: US 9,264,220 B2
(45) Date of Patent: Feb. 16, 2016

(54) SECURE VIRTUAL MACHINE PROVISIONING

(75) Inventors: Christian Gehrmann, Lund (SE); András Méhes, Sundbyberg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 133 days.

(21) Appl. No.: 14/111,212

(22) PCT Filed: Apr. 26, 2011

(86) PCT No.: PCT/SE2011/050502
§ 371 (c)(1),
(2), (4) Date: Oct. 11, 2013

(87) PCT Pub. No.: WO2012/148324
PCT Pub. Date: Nov. 1, 2012

(65) Prior Publication Data
US 2014/0032920 A1 Jan. 30, 2014

(51) Int. Cl.
G06F 12/14 (2006.01)
G06F 11/30 (2006.01)
H04L 9/00 (2006.01)
G06F 21/57 (2013.01)
H04L 29/06 (2006.01)
H04L 9/08 (2006.01)
(Continued)

(52) U.S. Cl.
CPC ............... *H04L 9/006* (2013.01); *G06F 21/53* (2013.01); *G06F 21/57* (2013.01); *H04L 9/08* (2013.01); *H04L 9/0822* (2013.01); *H04L 9/0825* (2013.01); *H04L 9/3247* (2013.01); *H04L 63/0442* (2013.01); *G06F 2009/45587* (2013.01); *G06F 2221/2149* (2013.01); *G06F 2221/2153* (2013.01); *H04L 63/0876* (2013.01); *H04L 2209/127* (2013.01)

(58) Field of Classification Search
None
See application file for complete search history.

(56) References Cited

U.S. PATENT DOCUMENTS

2003/0108205 A1 6/2003 Joyner et al.
2010/0023743 A1 1/2010 Sastry et al.
(Continued)

FOREIGN PATENT DOCUMENTS

WO 2008031148 A1 3/2008
WO 2009155574 A1 12/2009
(Continued)

OTHER PUBLICATIONS

Trusted Computing Group, "TPM Main Part 3 Commands", Specification version 1.2, Level 2 Revision 103, Jul. 9, 2007, pp. 1-330, TCG Published.
(Continued)

*Primary Examiner* — Kaveh Abrishamkar
(74) *Attorney, Agent, or Firm* — Patent Portfolio Builders, PLLC (57) ABSTRACT

A device and method in a provisioning unit of secure provisioning of a virtual machine on a target platform having a specific configuration is provided. The method comprising: receiving (404) a public binding key from the target platform (107), the public binding key being bound to the specific configuration, encrypting (410) a virtual machine provisioning command using the public binding key, and sending (412) the encrypted virtual machine provisioning command, to the target platform (107). By the provided device and method secure provisioning of a virtual machine on a target platform is enabled.

25 Claims, 7 Drawing Sheets

(51) Int. Cl.
*H04L 9/32* (2006.01)
*G06F 21/53* (2013.01)
*G06F 9/455* (2006.01)

(56) References Cited

U.S. PATENT DOCUMENTS

2010/0082984 A1* 4/2010 Ellison et al. ................ 713/170
2010/0218243 A1   8/2010 DeHaan et al.
2011/0202765 A1* 8/2011 McGrane et al. ............. 713/168
2011/0202916 A1* 8/2011 VoBa et al. ....................... 718/1
2011/0302400 A1* 12/2011 Maino et al. ...................... 713/2

FOREIGN PATENT DOCUMENTS

WO 2010085255 A1 7/2010
WO 2011141579 A2 11/2011

OTHER PUBLICATIONS

TCG Infrastructure Working Group, "Integrity Report Schema Specification", Specification version 1.0, Revision 1.0, Nov. 17, 2006, pp. 1-41, TCG Incorporated.

* cited by examiner

Fig. 7

SECURE VIRTUAL MACHINE PROVISIONING

TECHNICAL FIELD

The invention relates generally to a method and device for secure provisioning of a virtual machine on a target platform, and in particular to secure provisioning that establishes that the target platform is a trusted target platform.

BACKGROUND

In the past years, there has been a strong move in the field of computing services towards usage of virtualization technologies. Virtualization allows the running of unmodified legacy applications on hardware platforms. This is realized through on-the-fly translation from one hardware instruction set to another with the assistance of a so-called hypervisor or Virtual Machine Monitor (VMM). A VMM runs in a so called "most privileged mode" in a computer system running a virtual machine and has full control over vital system resources. A VMM-based system does not only allow instruction translation, but increased system utilization as multiple Virtual Machines (VMs) can run simultaneously on a single powerful hardware platform, opening for different business models. This implies, for example, that existing services can rather easily be migrated into large computing clusters, often referred to as "the cloud".

One drawback of this new flexibility is that it creates increased security risks. Systems which previously were physically isolated from each other, might run on the same machine which may entail unwanted interaction beyond control between VMs running simultaneously on the same hardware. Further, the VMM is exposed to threats both from external and internal sources. If the VMM is compromised this could affect the whole system.

Examples of VMM solutions are VMW are, Xen and KVM. Differences in underlying technology of the VMMs provides differences in the operation and performance of for example the above mentioned VMMs.

VMW are is a VMM with the ability of running directly on server hardware without requiring an additional underlying operating system. VMware software provides a completely virtualized set of hardware to the guest operating system and uses the CPU to run code directly whenever possible and a dynamic re-write code process called "binary translation" when the code needs to be migrated to a different CPU architecture.

Xen is a VMM that allows several guest operating systems to execute on the same computer hardware concurrently. On most CPUs, Xen uses a form of virtualization known as paravirtualization, meaning that guests run a modified operating system using a special hypercall API instead of certain architectural features.

KVM (Kernel-based Virtual Machine) is a VMM that uses the Linux operating system's kernel in order to virtualize a system, which gives good performance since user-space drivers can be avoided.

Many virtual machine platforms have a Trusted Platform Module (TPM), which is a special purpose hardware module. The TPM enables secure generation of cryptographic keys, protected computation and shielded storage. The TPM includes capabilities such as Remote attestation, Binding and Sealing. Remote attestation creates a secure signature over the current platform configuration in the form of signed hash values. This allows a remote third party to verify if trusted or untrusted software has been installed on the platform. Binding and sealing enables the usage of a particular private unique RSA (Rivest, Shamir and Adleman) key to be restricted to a certain platform state. The state is determined through the current values in the so-called Platform Configuration Registers (PCRs) in the TPM. The PCRs stores hash values of the software blocks that have been loaded into the platform. The RSA key is a private and public key pair is generated within the TPM or transferred to the TPM at production. The public RSA key may be used by third parties to Encrypt data such that access (through restricted usage of the corresponding private key) to the data is restricted to the platform being in the configuration in which the binding key was created. The TPM is further disclosed in "Trusted Platform Module overview", released by Trusted Computing Group (http://www.trustedcomputinggroup.org).

Virtualization technologies as such can provide secure isolation and protect different VMs that run on a shared platform while being isolated from each other, but the isolation as well as other security properties of the system can only be guaranteed as long as a trusted VMM version is in use and trusted VMM configurations are in place.

From the view of a service provider, who runs services as VMs on virtual platforms, the provider would like to be ensured that virtualization software and configurations of the platforms are trusted and that a particular service (in the form of a VM) is bound to run only on the trusted platform with the trusted configurations.

In previously known virtual machine systems it is not certain that all security critical component including the VMM are trusted prior to launching a service or provisioning a virtual machine on a platform.

SUMMARY OF INVENTION

It is an object of the embodiments herein to address at least some of the problems and shortcomings outlined above by using a method and an arrangement as defined in the attached independent claims.

According to one aspect, a provisioning unit for secure provisioning of a virtual machine on a target platform having a specific configuration is provided. The provisioning unit comprising an encryption unit, adapted to encrypt a virtual machine provisioning command using a public binding key received from the target platform and bound to the specific configuration, and a sending unit adapted to send the encrypted virtual machine provisioning command to the target platform.

According to another aspect, a method in a provisioning unit of secure provisioning of a virtual machine on a target platform having a specific configuration is provided. The method comprising receiving a public binding key from the target platform, the public binding key being bound to the specific configuration, encrypting a virtual machine provisioning command using the public binding key, and sending the encrypted virtual machine provisioning command, to the target platform.

By the provided arrangement and method, encryption of the provisioning command using a public binding key bound to the specific configuration of the target platform is provided such that the provisioning unit can establish that the target platform is the intended target platform with the intended configurations.

The above method and arrangement may be configured and implemented according to different optional embodiments. According to one embodiment, the sending unit is further adapted to send a configuration information request to the target platform, and the provisioning unit further comprises a receiving unit adapted to receive information on the specific configuration, from the target platform, in response to the request The received information can be used by the provisioning unit or an intermediate gateway to determine that the target platform is the intended target platform.

According to one embodiment, the receiving unit adapted to receive information on the specific configuration based on at least one of the hardware configuration, and the software configuration. The received information may be received from a Trusted Platform Module of the target platform.

According to one embodiment, the encryption unit is further adapted to encrypt the virtual machine provisioning command using a symmetric key created by the provisioning unit, and encrypt the symmetric key with the public binding key, and wherein the sending unit is further adapted to send the encrypted symmetric key to the target platform. By using a symmetric key for encrypting the provisioning command, large amounts of data may be included in the provisioning command.

According to one embodiment, the provisioning unit further comprises a verifying unit adapted to verify that the specific information on the configuration identifies a trusted target platform by comparing the received configuration information with information on trusted configurations which have been stored in a database.

According to one embodiment, the provisioning unit is further adapted to enter the sending of the provisioning command into a log, such that the history of occurred actions is preserved.

According to one embodiment, the sending unit is further adapted to send a binary version of a virtual machine and parameters enabling the virtual machine to execute on the target platform.

According to one embodiment, the sending unit is further adapted to send a key request to the target platform, and the receiving unit is adapted to receive the public binding key in response to the key request According to one embodiment, the provisioning unit is further adapted to sign the encrypted provisioning command with a key unique to the provisioning unit According to another aspect, a target platform having a specific configuration is provided. The target platform comprising a receiving unit adapted to receive a virtual machine provisioning command encrypted by a public binding key bound to the specific configuration.

According to another aspect, a method in a target platform of receiving secure provisioning commands is provided, the target platform having a specific configuration, the method comprising receiving a virtual machine provisioning command encrypted using a public binding key bound to the specific configuration.

By the provided arrangement and method, secure provisioning of the target platform is provided. According to one embodiment, the receiving unit is further adapted to receive a request for the public binding key and configuration information from a provisioning unit The target platform further comprises a sending unit adapted to send the public binding key and information on the specific configuration, in response to the request According to one embodiment, the sending unit is adapted to send the public binding key generated by a Trusted Platform Module of the target platform.

According to one embodiment, the sending unit is further adapted to send configuration information based on at least one of the hardware configuration and the software configuration obtained from a Trusted Platform Module of the target platform.

According to one embodiment, the receiving unit is further adapted to receive an encrypted symmetric key and the encrypted virtual machine provisioning command encrypted with the symmetric key. The symmetric key is decrypted by the Trusted Platform Module using a private binding key bound to the specific configuration, and the target platform further comprises a calculating unit adapted to use the symmetric key for decrypting the virtual machine provisioning command.

According to one embodiment, the receiving unit is adapted to receive a binary version of a virtual machine and parameters enabling the virtual machine to execute on the target platform.

Further possible features and benefits of this solution will become apparent from the detailed description below.

BRIEF DESCRIPTION OF DRAWINGS

Embodiments are now described, by way of example, with reference to the accompanying drawings, in which.

DETAILED DESCRIPTION

In the following a detailed description of exemplifying embodiments will be given. In the figures, like reference numerals designate identical or corresponding elements throughout the several figures.

An arrangement and method for secure provisioning of a virtual machine on a target platform are provided. The secure provisioning is enabled by encrypting a provisioning command, to be sent to the target platform, in a provisioning unit, using a public binding key cryptographically bound to the target platform and to the particular configuration of the target platform on which the virtual machine should be provisioned.

By encrypting the provisioning command such that only the intended target platform can encrypt the data using the corresponding private binding key, the provisioning unit can establish that the virtual machine is launched or provisioned on a trusted and intended target platform.

Since the public binding key used for encrypting the provisioning command can be bound to any configuration of target platforms, using any virtualization technology, the secure provisioning is possible independent of the VMM or the actual protocols used between provisioning unit 103 and target platform 107

Figure 1:
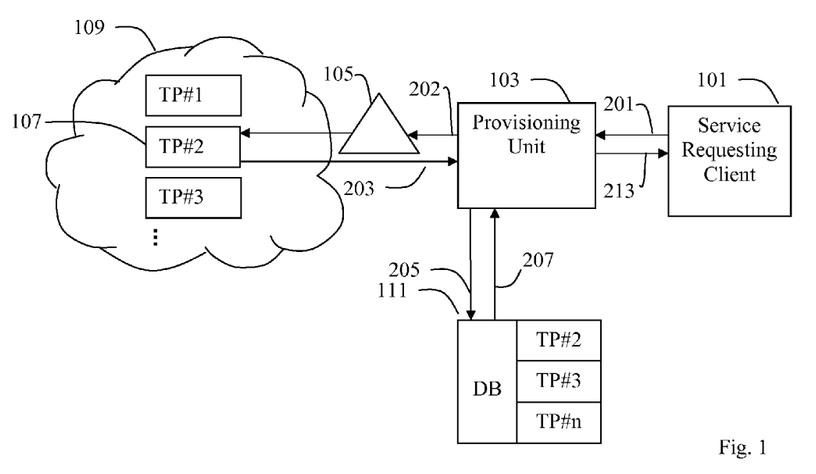
FIG. 1 is an overview of an arrangement and method for secure virtual machine provisioning, according to some possible embodiments.

FIG. 1 is an overview of an exemplifying embodiment of secure provisioning of a virtual machine, in which a service requesting client 101 requests a resource from a resource provider network 109 of virtualized resources. The term "Service requesting client" is to be understood in a broad sense as representing any client that could request a virtualized service, such as for example an operator in a mobile communications system or a node in the Internet. A resource is herein referred to as a "target platform 107", "trusted target platform 107" or "virtual machine platform 107". A resource provider network 109 of virtualized resources is generally referred to as a "cloud". The resource provider network 109 is managed by a provisioning unit 103 adapted to launch and manage virtual machines on the target platforms 107 in the resource provider network. Provisioning unit 103 is to be understood in a broad sense as a unit connected to, and capable of provisioning or managing the virtual machine on a target platform 107. For example, in a mobile communications system, the provisioning unit may be an operator management unit enabling the operator to manage a virtual machine. The provisioning unit 103 could be a unit in a node in large network, or a unit in a single or distributed datacenter (sometimes referred to as a private cloud), or a storage controller in a Storage Area Network (SAN) or a unit in a single computer with virtualized features.

According to the exemplifying embodiment disclosed with reference to FIG. 1, the provisioning unit 103 is in connection with a database 111, which enables the provisioning unit 103 to perform a look-up. The database 111 comprises stored information on configurations, which for example could be in the form of stored platform configuration register (PCR) parameters of trusted platform configurations received from a Trusted Platform Module (TPM) of the target platform or from a data base with trusted reference (PCR) parameters. In alternative embodiments, the look-up could be performed by the target platform 107, in which case the database 111 is connected to the target platform 107 instead of to the provisioning unit 103.

Optionally, the provisioning unit 103 may be in communication with the target platform 107 via a gateway 105 (further described in FIG. 6) which could locate a suitable platform, authenticate the provisioning unit 103 and establish a secure channel between the provisioning unit 103 and the gateway 105.

The method is initiated with a receipt of a service request 201 from a service requesting client 101. The provisioning unit 103 or the gateway uses a discovery mechanism to find a suitable free target platform 107 in the platform provider network 109. A discovery mechanism is a protocol that allows the provisioning unit to request a list of available platform resources based on discovery request criteria. In some possible alternative embodiments, the platform provider network 109 may pre-assign a target platform 107 for use by the provisioning unit 103, in which case the discovery step may be omitted altogether. In the next action the provisioning unit sends a request for a public binding key and configuration information 202, to the target platform 107. The request for configuration information could be a request for the target platform's 107 current virtualization layer and hardware platform configuration status (an example of which is described with reference to FIG. 7). In response to the request, the target platform 107 sends configuration information 203 associated with the specific configuration of the target platform 107 to the provisioning unit 103 and a public binding key. The public binding key is the public part of the binding key pair where the usage of the private binding key part is bound to the specific configuration of the target platform 107 (as described in the background section). The public binding key is used to encrypt a provisioning command such that the provisioning command only can be decrypted by the target platform holding the corresponding private key, when the target platform has the specific configuration.

After receipt of the configuration information, the provisioning unit 103 optionally verifies that the target platform 107 is a trusted target platform 107 by performing a look-up 205/207 in a database 111 in connection with the provisioning unit 103.

After receipt of the encrypted provisioning command, the target platform 107 asks the TPM to decrypt the provisioning command using the private binding key. If the provisioning command is encrypted by a symmetric key which in turn is encrypted with the public bonding key, the target platform 107 asks the TPM to decrypt the symmetric key using the private binding key and the target platform 107 then uses the symmetric key to decrypt the provisioning command. The private binding key is bound to the reported configurations of the target platform 107 and the TPM only allows the target platform to use it when the platform is in a state that corresponds to the reported configuration (enforced by the TPM). Since the key pair generated by the TPM is bound to the specific configuration of the target platform 107, and the provisioning command is encrypted with the public binding key, the provisioning unit can be certain that the VM is provisioned on a target platform having the specific configuration on the basis of which the public binding key was created (see description of TPM in Background).

According to one exemplifying embodiment, the provisioning of the VM comprises the launching of the VM, in which case the provisioning command comprises a special VM launch package containing the VM image and necessary configuration information. If the target platform 107 has the correct configuration, it will be able to request a decryption of a secret key by usage of the private binding key in the TPM and decrypt the VM launch package (as previously described) and launch the VM on the trusted target platform 107. By binding the launch to the configuration, the service provider, who runs services as VMs on target platforms 107, is ensured that the virtualization software and configurations of the platform are trusted for launching a VM on a particular target platform 107. Furthermore, the provider can make sure that the particular service launched on the target platform 107 is cryptographically bound to only run on a trusted platform and with trusted configurations by further management commands being encrypted with the public binding key.

For further provisioning or management of the VM, the target platform 107 can generate a public identifier "VM Handle" or "VM Token" which is a reference to a "session key" for VM provisioning/ management which could be included in the encrypted launch package for further provisioning/management actions.

According to one embodiment, the provisioning command, which may include a launch or provisioning package, is encrypted with a symmetric key. Encrypting the provisioning command using a symmetric key may be necessary since the VM configuration may comprise considerable data amounts. The symmetric key may in turn be encrypted by the public binding key received from the target platform, such that only the target platform can decrypt the symmetric key and use it for decrypting the provisioning command and only when the target platform is in the specific state.

The target platform 107 may verify (through a certificate or similar) a provisioning unit signature to establish that the provisioning unit is a trusted provisioning unit and may report the provisioning or launch in a log file, which ensures that the service provider cannot repudiate the provisioning command.

Figure 2:
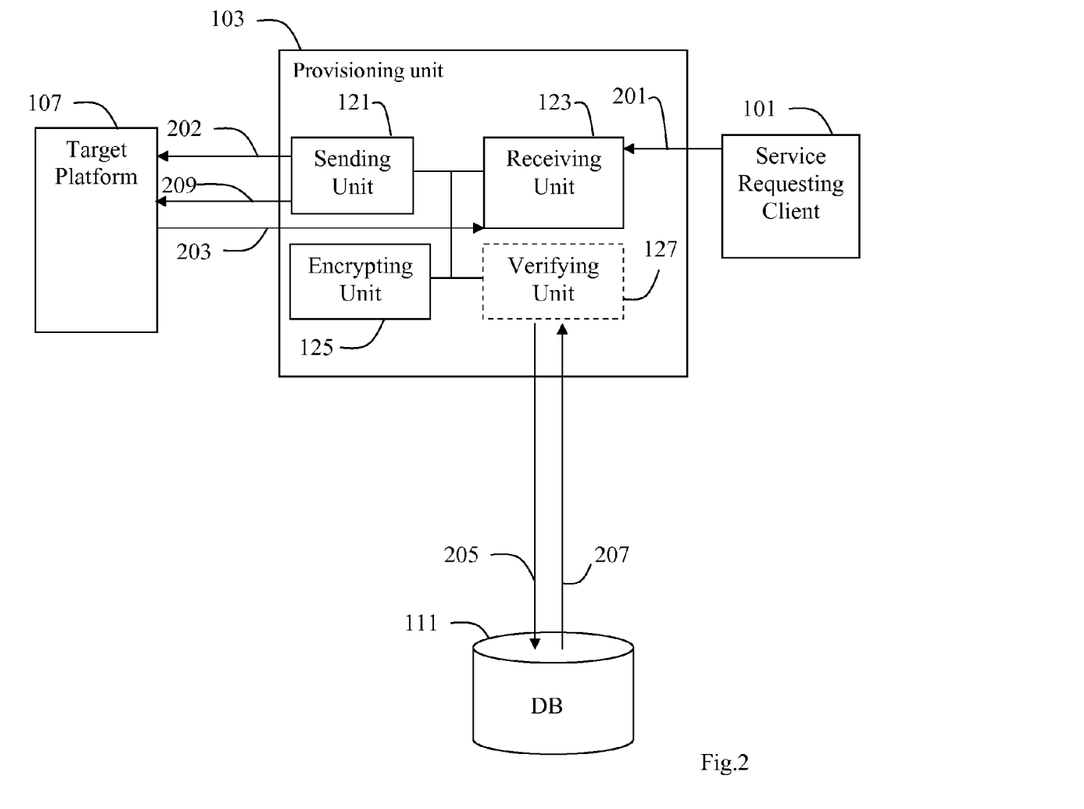
FIG. 2 is a block diagram showing a provisioning unit for secure provisioning of a virtual machine, according to one embodiment.

FIG. 2 is a block diagram of an embodiment of the provisioning unit 103 of FIG. 1 in further detail. The provisioning unit 103 comprises a sending unit 121 adapted to send the virtual machine provisioning command 209 encrypted using a public binding key bound to the target platform 107 configuration, to the target platform 107, thereby enabling secure provisioning of the VM. By encrypting the provisioning command using the public binding key received from the target platform 107 the provisioning unit 103 can make certain that the target platform 107 remains in the specific configuration.

The sending unit may further be adapted to send a request 202 for the public binding key and configuration of the target platform, to the target platform 107. The target platform 107 has a specific configuration related to the hardware, the software, the firmware, the TPM, the VMM or applications running on the target platform. In response to the request, the target platform sends the public binding key generated by the TPM of the target platform, and configuration information 203 to the provisioning unit 103. The provisioning unit 103 comprises a receiving unit 123 adapted to receive the public binding key and configuration information 203.

The provisioning unit 103 further comprises an encryption unit 125 in connection with the receiving unit 123. The encrypting unit 125 is adapted to encrypt provisioning command to be sent to the target platform using the received 203 binding key.

In the exemplifying embodiment shown in FIG. 2, the receiving unit 123 is further adapted to receive a service request 201 from a service requesting client 101, however this should be considered as optional since the provisioning unit 103 could act without a direct input from a service requesting client 101.

According to one possible embodiment, the virtual machine provisioning command 209 is a VM launch package for launching a VM on a target platform 107. By encrypting the VM launch package using the public binding key received from the target platform 107, the provisioning unit could be guaranteed that the virtualization software and configurations of the target platform 107 are trusted for launching a VM on a particular target platform 107.

The provisioning unit may furthermore comprise a verifying unit 127 connected to the receiving unit 123. The verifying unit 127 is adapted to verify that the specific configuration of the target platform 107 is trusted. The verifying process may be implemented by comparing the received configuration information 203 with information on trusted configurations which have been stored in a database 111.

The action of comparing the received configuration information 203 with information on trusted configurations could be performed as a look-up, where the verification unit 127 sends a look-up request 205 to the database 111 and receives a look-up response 207 which could be interpreted by the verification unit 127 to determine if the specific configuration of the target platform 107, is trusted. In alternative embodiments, the verification process could be performed in the target platform 107 and in further alternative embodiments, the target platform 107 could be assigned by the service requesting client, in which case the target platform 107 is considered to be trusted and no further verification is required.

In embodiments where the virtual machine provisioning command is encrypted using a symmetric key, the symmetric key is in turn encrypted by the public binding key received from the target platform 107, such that the target platform 107 only can access the symmetric key and thereby the provisioning command encrypted with the symmetric key by accessing the private binding key generated by the TPM, which is only possible when the target platform has the specific configuration.

Figure 3:
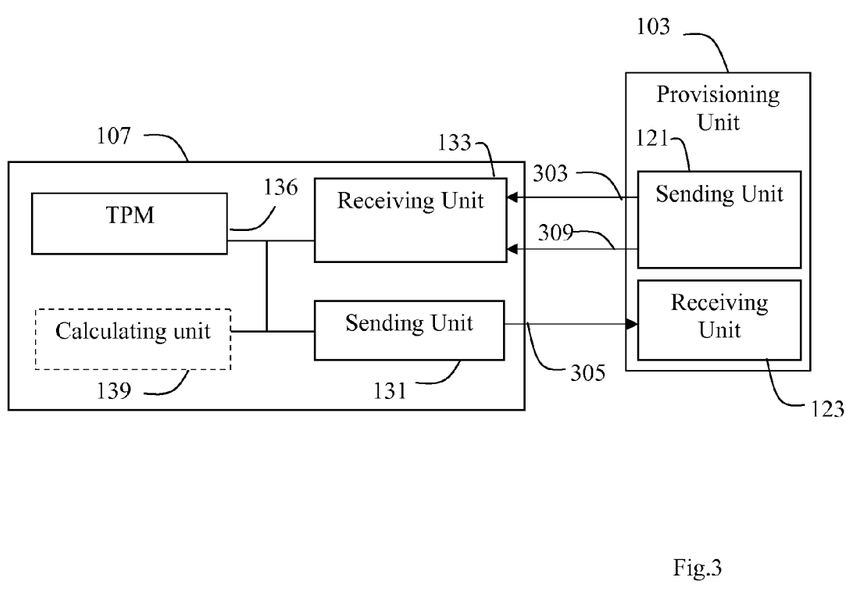
FIG. 3 is a block diagram showing a target platform for a virtual machine, according to one embodiment.

FIG. 3 is a block diagram showing an embodiment of a target platform 107, which may be the target platform of FIGS. 1 and 2. The target platform 107 has a specific configuration. In order to act with a provisioning unit 103, the target platform 107 comprises a receiving unit 133 adapted to receive a configuration information request 303 from the provisioning unit 103. The target platform 107 further comprises a sending unit 131 adapted to send configuration information 305 associated with the specific configuration of the target platform 107 to the provisioning unit 103, in response to the request. The receiving unit 133 is further adapted to receive a virtual machine provisioning command encrypted by the public binding key bound to the specific configuration of the target platform 107. Upon receipt of the provisioning command, the target platform 107 asks the TPM 136 to decrypt the provisioning command using the private binding key bound to the specific configuration of the target platform 107, i.e the target platform 107 can only decrypt the provisioning command when in the specific configuration. Alternatively the virtual machine provisioning command is encrypted by a symmetric key, which is encrypted by the public binding key and provided together with the encrypted provisioning command. In this alternative the symmetric key is being decrypted by the TPM through using the private binding key, which is possible only when the target platform is in the specific configuration. The decrypted symmetric key is used by the target platform to decrypt the provisioning command.

The target platform 107 is furthermore optionally adapted to decrypt the virtual machine provisioning command using a symmetric key received at the receiving unit 133. The received virtual machine provisioning command could be symmetrically encrypted using the symmetric key and sent together with the symmetric key, which in turn is encrypted by the public binding key bound to the target platform. The encrypted symmetric key is first decrypted and then used by a calculating unit 139 of the target platform 107 for decrypting the virtual machine provisioning command.

Figure 4:
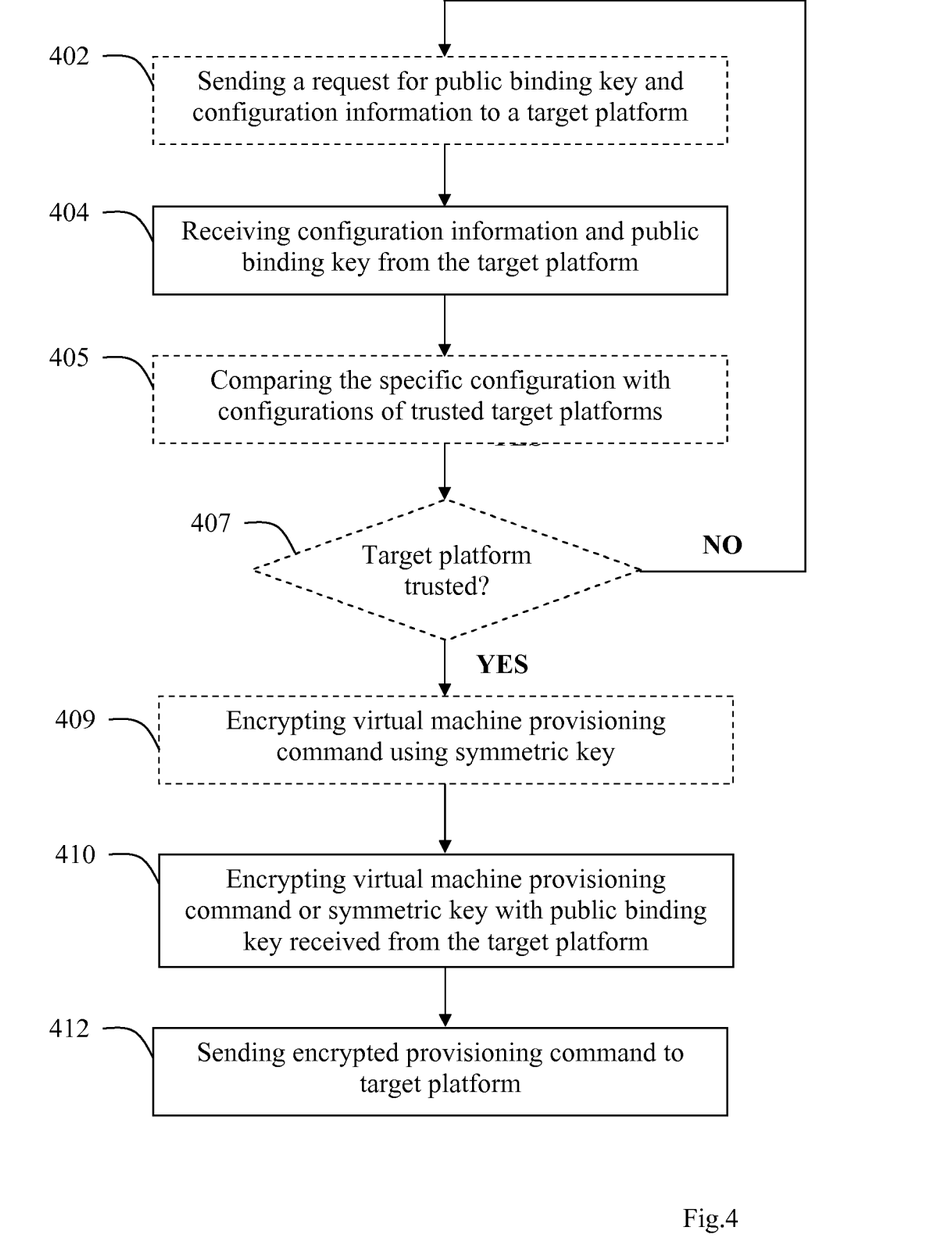
FIG. 4 is a flow chart showing a method M a provisioning unit for secure provisioning of a virtual machine, according to one embodiment.

FIG. 4 is a flowchart of an exemplifying method in a provisioning unit, e.g. the provisioning unit 103 of FIGS. 2 and 3, for secure provisioning of a VM on a target platform. In this example the provisioning unit sends a request for public binding key and configuration information to a target platform 402, and in response thereto receives 404 configuration information and the public binding key from the target platform. The configuration information is associated with the specific configuration of the target platform and could for example be information related to the software, hardware or TPM of the target platform. The provisioning unit verifies 405 that the target platform is a trusted target platform by comparing the specific configuration with configurations of trusted target platforms. The verification could e.g. be done according to the Trusted Computer Group (TCG) attestation procedure.

The virtual machine provisioning command is encrypted with a symmetric key 409, which in turn is encrypted by the public binding key received from the target platform 410. The encrypted virtual machine provisioning command and symmetric key is sent to the target platform, thus enabling secure provisioning of the target platform.

According to one embodiment, the provisioning of the VM is a launch of a VM, in which case the launch command is encrypted by the public binding key received from the target platform. The launch command along with the VM configurations and the VM identity can be encrypted using a symmetric key which in turn is encrypted by the public binding key, which ensures that the VM can only be launched on the intended target platform, because only that target platform can access the corresponding private binding key and decrypt the symmetric key used for decryption of the launch command.

Figure 5:
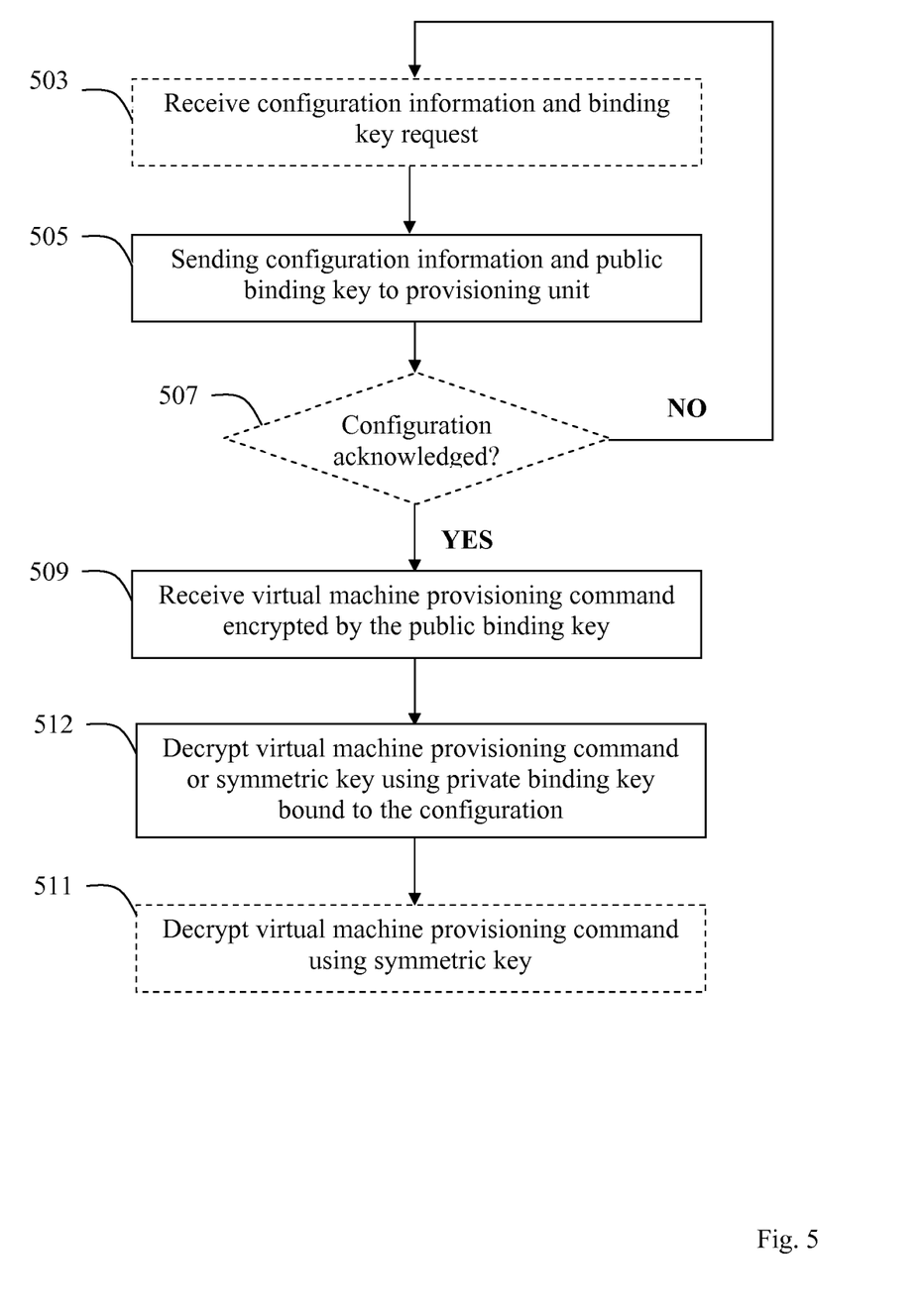
FIG. 5 is a flow chart showing a method M a target platform for secure provisioning of a virtual machine, according to one embodiment.

FIG. 5 is a flow chart of an embodiment of a method of secure provisioning of a VM as executed in a target platform. Firstly, configuration information and binding key request is received 503 from a provisioning unit. In response to the request, the target platform sends 505 configuration information associated with the specific configuration of the target platform and the public binding key to the provisioning unit. The configuration information could for example be one or more parameters associated with a current state of the platform configuration register. After the optional step of sending configuration information, the target platform receives 509 a virtual machine provisioning command from the provisioning unit, the virtual machine provisioning command being encrypted by the public binding key received from the target platform. Alternatively, the provisioning command is encrypted by a symmetric key, which in turn is encrypted by the public binding key and appended to the provisioning command. The public binding key is generated by the TPM of the target platform, which holds the corresponding private key, and thereby bound to the configuration of the target platform.

After receipt 509 of the encrypted provisioning command, the target platform decrypt 512 the VM provisioning command using the private binding key generated by the TPM, which can be accessed only when the target platform has the specific configuration.

Figure 6:
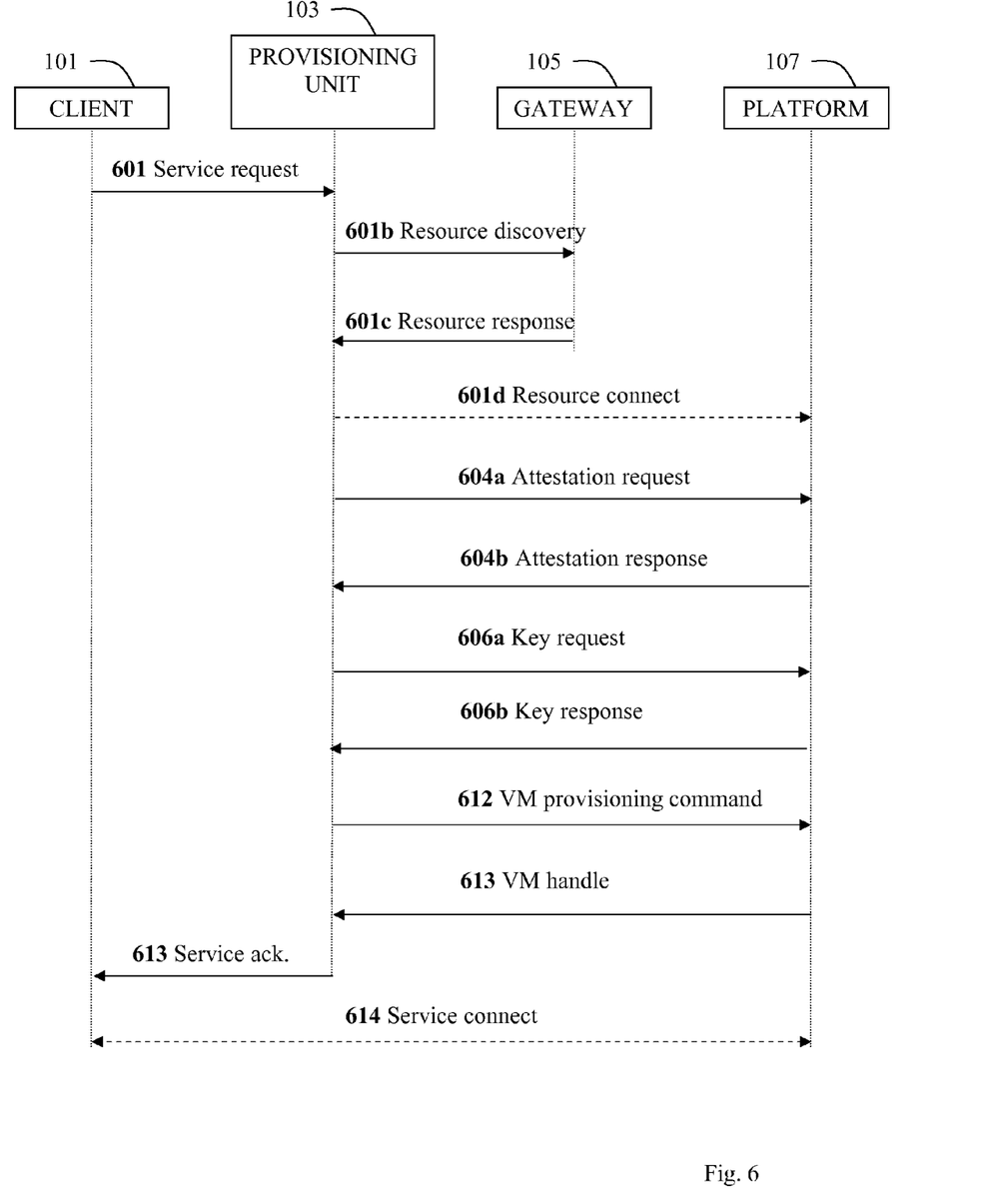
FIG. 6 is a signaling diagram showing an embodiment for secure provisioning of a virtual machine.

FIG. 6 is a signaling diagram of an embodiment in which the method of secure provisioning is implemented in a virtualized computer system. In the shown procedure, the target platforms 107, e.g. any of the target platforms previously described, authenticates all service requests 601 from clients 101 through a platform provider gateway 105 which authenticates and establishes a secure channel between the provisioning unit 103 and the gateway 105. Similarly, the provisioning unit 103 ensures that it connect to a trusted resource target platform 107. As one example, standard VPN (Virtual Private Network) protection mechanisms can be used to provide the secure channel and the Internet Key Exchange (IKE) protocol could for example be used in combination with Internet security protocol.

After the establishment of the secure connection, the provisioning unit 103 issues a resource discovery request 601b to gateway 105 searching for a particular resource (target platform 107) or resource type and gets a response 601c from the gateway 105 with a handle that can be used by the provisioning unit 103 to perform a resource connect 601d, to connect to the target platform 107. Alternatively, a handle for the target platform 107 may be provided to the service provider out-of-band, in which case explicit discovery is not needed. In this alternative case, connection to a platform provider gateway 105 may also be omitted, and the provisioning unit may connect directly to the target platform 107.

Before provisioning or launching a VM to a particular target platform, the provisioning unit needs to verify the integrity of the Trusted Computing Base (TCB) of the target platform, i.e., the hardware and software part of the platform upon which the security of the platform depends like the hardware, virtualization layer software and VMM configurations in an attestation step. This is for example done according to the Trusted Computer Group (TCG) attestation procedure.

The attestation start with the provisioning unit sending a request 604a to the Target Platform 107 with a request to report its integrity state comprising configuration information of the target platform. The target platform Management Agent requests the Integrity Manager to generate an Attestation Response 604b. The Attestation Response 604b comprises configuration information of the target platform 107 which for example could be the current state of the Platform Configuration Registers (PCRs) and the Integrity Report.

According to one exemplifying embodiment, the TPM on the target platform 107 is requested to sign the current state of the Platform Configuration Registers with the TPM identity key. The Integrity Report could be generated according to the Trusted Computing Group Integrity Schema. The integrity report is signed using the TPM identity key which ensures that it belongs to the Trusted Platform identified in an AIK-Certificate (Attestation Identity Key Certificate). The configuration information in form of the current platform configuration registers state; the Integrity Report and the AIK-Certificate are received by the provisioning unit 103 as the attestation response 604b.

After receiving the attestation response, the provisioning unit validates the AIK-Certificate and the signatures and verifies the received integrity report with the trusted reference metrics, using, for example, a lookup i.e. comparing the configuration information of the target platform with configurations of trusted target platforms in for example a suitable database (for example 111 in FIG. 4). In an alternative embodiment, the verification is outsourced to a trusted service, and in yet another alternative embodiment, the target platform can make such a request and include the result in it response. After receipt of the attestation response 604b the provisioning unit 103 computes a cryptographic one-way hash h1 of the received attestation response 604b to be used in the provisioning step.

In a key exchange step, a key request 606a is sent to the target platform 107. In response thereto the target platform 107 sends a key response 606b comprising a public bind key generated by the TPM of the target platform 107 and having a corresponding private key held by the TPM and being bound to the specific configuration of the target platform 107. After receipt of the key response 606b the target platform computes a hash h2 of the key response 606b to be used in the provisioning step.

A virtual machine provisioning command is then encrypted using a symmetric key. The symmetric encryption is only necessary in embodiments where the provisioning command contains large amounts of data. The symmetric key is in turn encrypted by the public binding key received by the provisioning unit. The virtual machine provisioning command is then sent 612 to the target platform 107 that decrypt the provisioning command using the private binding key which is generated by the TPM.

The provisioning of the VM could be a launch of a VM, in which case the launch is encrypted using the public binding key, which means that the VM will only be able to launch on the target platform 107 with the reported unique set of configurations. A symmetric key is used to encrypt the VM along with the VM identity and related target platform configurations, if this concerns considerable amounts of data. The symmetric key is in turn encrypted using the public binding key received from the target platform 107, which ensures that the VM can only be launched on the intended target platform 107.

In order to cryptographically bind the different protocol steps—attestation (604a; 604b), key exchange (606a; 606b) and provisioning (612)—the provisioning unit appends the second cryptographic one-way hash h2 of the key response to the first cryptographic one-way hash h1, and computes h, a hash of h1 combined with h2, for example h1 concatenated with h2, which is also sent 612 to the target platform 107 along with the rest of the provisioning command. The provisioning unit 103 may also cryptographically sign the VM launch message so that the service provider cannot repudiate the launch later on.

After receipt, the target platform 107 decrypt the symmetric key using the private binding key, if symmetric encryption is used, and then decrypt the VM launch credentials using the symmetric key, and optionally verifies the provisioning unit launch signature. The target platform 107 performs necessary validations and optionally checks operator license for VM launch rights, and optionally also updates corresponding charging records. It then launches the service provider VM and sends a virtual machine handle 613 to the provisioning unit 103.

In an alternative embodiment, the target platform also generates a "virtual machine token", which is returned to the provisioning unit encrypted with a suitable provisioning unit encryption key sent to the target platform as part of the protected launch command. This "virtual machine token" along with the "virtual machine handle" can then be used to issue other provisioning commands (e.g. shutdown, reboot, pause, resume, etc.) concerning this VM, in similar protocol runs, where the VM launch message is replaced by a virtual machine provisioning message including a proof that the provisioning unit knows the virtual machine token.

A service acknowledgement 613 is returned to the requesting client 101 along with the virtual machine handle which enables the client to connect 614 to the VM on the target platform 107.

Figure 7:
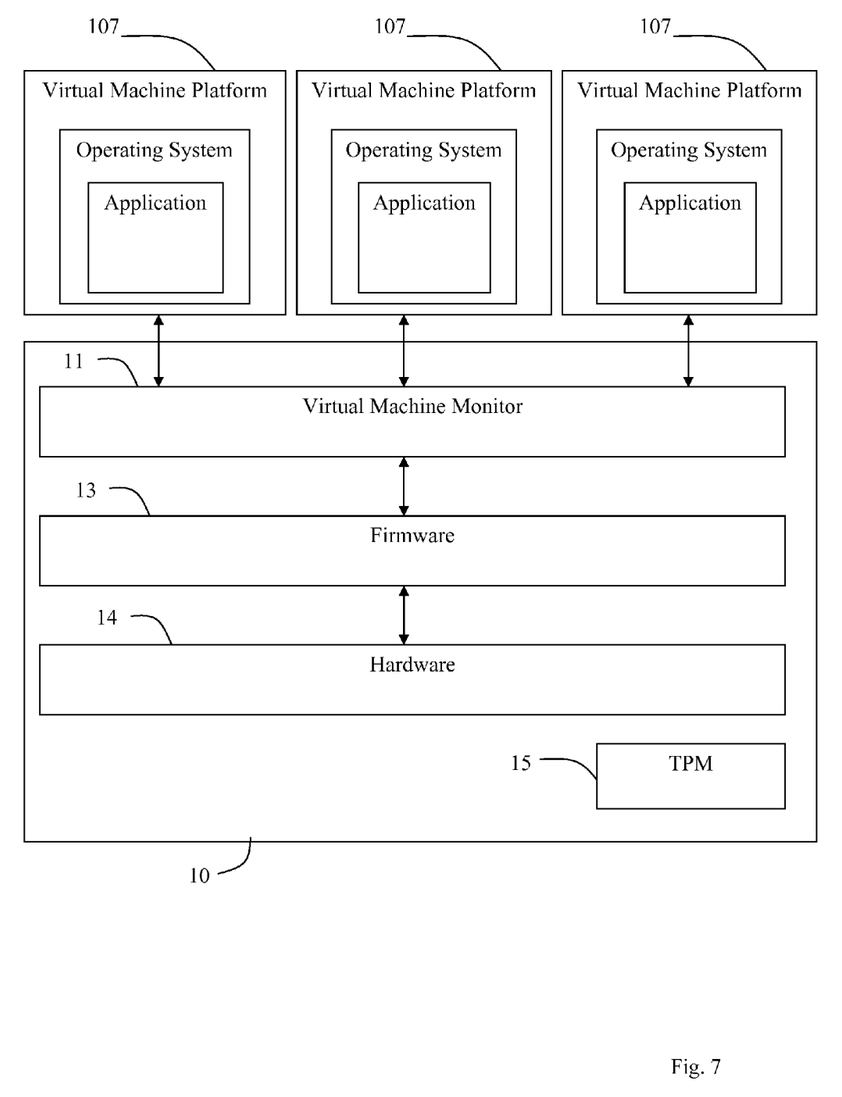
FIG. 7 shows an overview of a virtualized computer system.

FIG. 7 is a block diagram of an exemplifying embodiment of a virtualized computer system providing a plurality of virtual machine platforms 107 or target platforms 107. For the purpose of this description, virtual machine platform and target platform is to be understood as synonymous, the target platform is the virtual machine platform being target for the communication from the provisioning unit. It should be noted that the embodiment of FIG. 1 is an example of a virtualized computer system and in alternative embodiments, which could be used in methods described herein; component described with reference to FIG. 1 may be excluded or combined.

A host system 10 is a platform on which several virtual machines may run simultaneously. The host system includes hardware 14 comprising a processor, which may be a single CPU (Central processing unit), or could comprise two or more processing units. For example, the processor may include general purpose microprocessors, instruction set processors and/or related chips sets and/ or special purpose microprocessors such as ASICs (Application Specific Integrated Circuit). The processor may also comprise board memory for caching purposes. The hardware 14 further comprises memory, which may for example be a flash memory, a RAM (Random-access memory), a ROM (Read-Only Memory) or an EEPROM (Hectically Erasable Programmable ROM). The hardware 14 could further comprise a network interface, input device(s), output device(s), and/or mass storage device(s). The host system 10 further comprises a special hardware module, the Trusted Platform Module (TPM) 15, that has the ability of storing integrity measurements by computing a hash summary of at least some of the hardware 14, firmware 13 and software 11 configuration parameters. The TPM 15 can be accessed by an external verifier to get a report on the current platform state. In alternative embodiments, the TPM 15 could be implemented in a software module, a so called virtual TPM (vTPM).

The host system 10 according to the exemplifying embodiment shown in FIG. 1 further comprises a firmware module 13 which may be implemented as machine accessible instructions to boot the host system 10. The firmware 13 may be part of or include the basic input/output system (BIOS) of the host system 10.

The host system 10 according to the exemplifying embodiment shown in FIG. 7 further comprises a Virtual Machine Monitor (VMM) 11 or hypervisor, which may be a firmware or a software component that is configured to enable multiple VMs running simultaneously and support a series of virtual environments or virtual machine platforms 107. The VMM 11 ensures that the operation of each of the plurality of VMs does not interrupt the operation of any other VM. As previously mentioned, the advantages of having a plurality of VMs running simultaneously on the same hardware however also create risks. The VMM is exposed to threats both from external and internal sources and if the VMM is compromised this could affect the whole system.

The host system 10 of the embodiment disclosed with reference to FIG. 7 supports a plurality of virtual machine platforms 107. Each of the plurality of virtual machine platforms 107 may operate like a complete physical machine that can run an operating system. Different VMs may run different and/or the same type of operating system. For example, a first VM may include an operating system such as the Microsoft Windows OS, a second VM may include an operating system such as the FreeRTOS, and a third VM may include an operating system such as Linux OS. In alternative embodiments, one or more of the plurality of VMs may be implemented as an execution environment such as a Java Virtual Machine (JVM) or a Microsoft.NET. common language runtime (CIR).

The configuration information could for example be a hash based on parameters associated with the software, the firmware, the TPM, the VMM and/or applications running on the target platform. A hash is to be understood as any value or parameter used to uniquely identify an associated value or set of values. A hash function or one-way hash function is to be understood as any function used to calculate a hash value from any associated value or set of values. An example of a hash function is the SHA-1 or SHA-256 one-way hash functions defined by NIST.

An advantage with virtualization is that a crash of an operating system in one of the plurality of VMs may not affect an OS executing in another VM because the VMs have isolated resources. In the example above, the Microsoft Windows operating system in the first VM and the Linux operating system in the third VM may not be affected by a crash in the Microsoft Windows operating system in the second VM.

It will be appreciated that the figures described are for illustration only and are not in any way restricting the scope of the invention. Please note that any embodiment or part of embodiment as well as any method or part of method could be combined in any way. All examples herein should be seen as part of the general description and therefore possible to combine in any way in general terms. It should be noted that the FIGS. 1-3, 6, 7 merely illustrate various units in the nodes or functional units in a logical sense, although the skilled person is free to implement these functions in practice using suitable software and hardware means.

The invention claimed is:

1. A provisioning device for secure provisioning of a virtual machine on a target platform having a specific configuration, the provisioning device comprising:

a receiving circuit configured to receive a public binding key from the target platform, the public binding key being bound to the specific configuration;
an encryption circuit configured to encrypt a virtual machine provisioning command using the public binding key;
a sending circuit configured to send the encrypted virtual machine provisioning command to the target platform;
wherein the encryption circuit is further configured to encrypt the virtual machine provisioning command using a symmetric key created by the provisioning device, and encrypt the symmetric key with the public binding key; and
wherein the sending circuit is further configured to send the encrypted symmetric key to the target platform.

2. The provisioning device of claim 1:
wherein the sending circuit is further configured to send a configuration information request to the target platform; and
wherein the receiving circuit is further configured to receive information on the specific configuration, from the target platform, in response to the configuration information request.

3. The provisioning device of claim 2, wherein the receiving circuit is configured to receive the information on the specific configuration from a Trusted Platform Module of the target platform, the information on the specific configuration based on at least one of:
a hardware configuration; and
a software configuration.

4. The provisioning device of claim 2, wherein the provisioning device further comprises a verifying circuit configured to verify that the information on the specific configuration identifies a trusted target platform by comparing the information on the specific configuration with information on trusted configurations, the information on trusted configurations being stored in a database.

5. The provisioning device of claim 1, wherein the provisioning device is further configured to log the sending of the encrypted virtual machine provisioning command.

6. The provisioning device of claim 1, wherein the sending circuit is further configured to send both a binary version of the virtual machine and parameters enabling the virtual machine to execute on the target platform.

7. The provisioning device of claim 1:
wherein the sending circuit is further configured to send a key request to the target platform; and
wherein the receiving circuit is configured to receive the public binding key in response to the key request.

8. The provisioning device of claim 1, wherein the encryption circuit is further configured to sign the encrypted virtual machine provisioning command with a key unique to the provisioning device.

9. A target platform having a specific configuration, the target platform comprising a receiving circuit configured to receive a virtual machine provisioning command encrypted by a public binding key bound to the specific configuration;
wherein the receiving circuit is further configured to receive a request for the public binding key and information on the specific configuration from a provisioning unit;
wherein the target platform further comprises a sending circuit configured to send, in response to the request, the public binding key and the information on the specific configuration;
wherein the receiving circuit is further configured to:
receive a symmetric key in an encrypted form; and
receive the virtual machine provisioning command encrypted with the symmetric key;
wherein the target platform further comprises a Trust Platform Module configured to decrypt the symmetric key using a private binding key bound to the specific configuration; and
wherein the target platform further comprises a calculating circuit configured to use the symmetric key for decrypting the virtual machine provisioning command.

10. The target platform of claim 9, wherein the target platform further comprises a Trusted Platform Module configured to generate the public binding key.

11. The target platform of claim 9:
wherein the target platform further comprises a Trust Platform Module;
wherein the sending circuit is further configured to obtain the information on the specific configuration from the Trusted Platform Module, the information on the specific configuration based on at least one of:
a hardware configuration; and
a software configuration.

12. The target platform of claim 9, wherein the receiving circuit is configured to receive a binary version of a virtual machine and parameters enabling the virtual machine to execute on the target platform.

13. A method in a provisioning device of secure provisioning of a virtual machine on a target platform having a specific configuration, the method comprising:
receiving, from the target platform, a public binding key bound to the specific configuration;
encrypting, by the provisioning device, a virtual machine provisioning command using the public binding key; and
sending, the encrypted virtual machine provisioning command to the target platform;
the provisioning device:
creating a symmetric key;
encrypting the virtual machine provisioning command using the symmetric key;
encrypting the symmetric key using the public binding key received from the target platform; and
sending the encrypted symmetric key to the target platform.

14. The method of claim 13, further comprising the provisioning device:
sending a configuration information request to the target platform; and
in response to the configuration information request, receiving information on the specific configuration from the target platform.

15. The method of claim 14:
wherein receiving information on the specific configuration comprises receiving the information on the specific configuration from a Trusted Platform Module of the target platform; and
wherein the information on the specific configuration is based on at least one of:
a hardware configuration; and
a software configuration.

16. The method of claim 14, further comprising verifying, by the provisioning device, that the information on the specific configuration identifies a trusted target platform by comparing the information on the specific configuration with information on trusted configurations, the information on trusted configurations being stored in a database.

17. The method of claim 13, further comprising the provisioning device logging the sending of the encrypted virtual machine provisioning command.

18. The method of claim 13, wherein sending the virtual machine provisioning command comprises sending both a binary version of the virtual machine and parameters enabling the virtual machine to execute on the target platform.

19. The method of claim 13, further comprising the provisioning device contacting a gateway configured to assign the target platform.

20. The method of claim 13, further comprising the provisioning device sending a key request to the target platform, and receiving the public binding key in response to the key request.

21. The method of claim 13, further comprising the provisioning device signing the encrypted virtual machine provisioning command with a key unique to the provisioning device.

22. A method in a target platform of receiving secure provisioning commands, the target platform having a specific configuration, the method comprising:
    receiving, by the target platform, a virtual machine provisioning command encrypted using a public binding key bound to the specific configuration;
    the target platform:
        receiving a request for the public binding key and a request for information on the specific configuration from a provisioning unit;
        sending, in response to the request, thepublic binding key and the information on the specific configuration;
        receiving a symmetric key in an encrypted form;
        receiving the virtual machine provisioning command encrypted with the symmetric key;
        decrypting the symmetric key using a private binding key; and
        decrypting the virtual machine provisioning command using the symmetric key.

23. The method of claim 22, wherein the public key is generated by a Trusted Platform Module of the target platform.

24. The method of claim 22, wherein sending information on the specific configuration comprises:
    obtaining the information on the specific configuration from a Trust Platform Module of the target platform; and
    wherein the information on the specific configuration is based on at least one of:
        a hardware configuration; and
        a software configuration.

25. The method of claim 22, wherein receiving the virtual machine provisioning command comprises receiving a binary version of a virtual machine and parameters enabling the virtual machine to execute on the target platform.

\* \* \* \* \*